Sept. 22, 1970          W. SMEIMAN          3,530,281
DATA STORAGE AND READOUT DEVICES
Filed Sept. 13, 1966          2 Sheets-Sheet 1
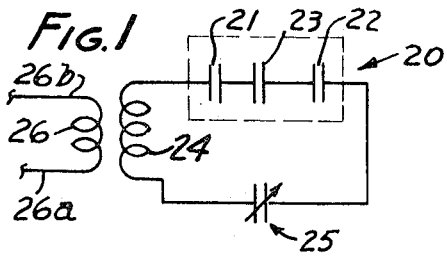
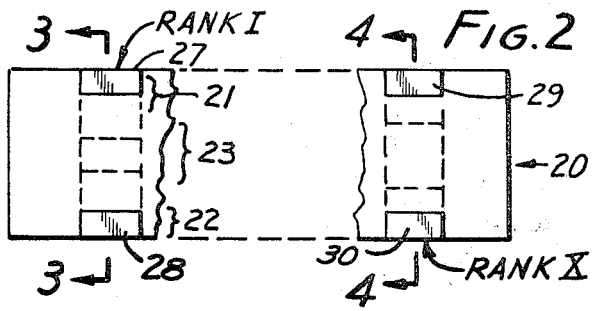
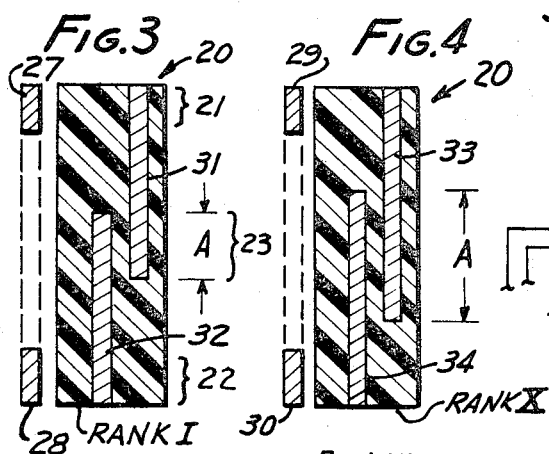
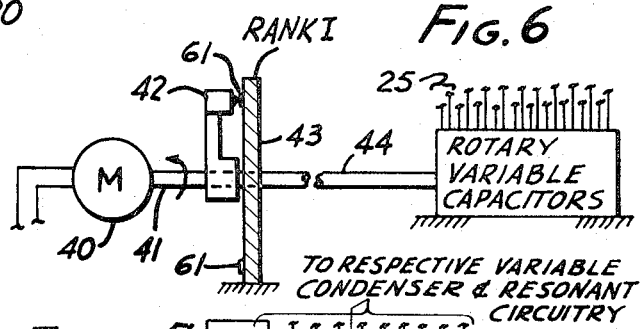
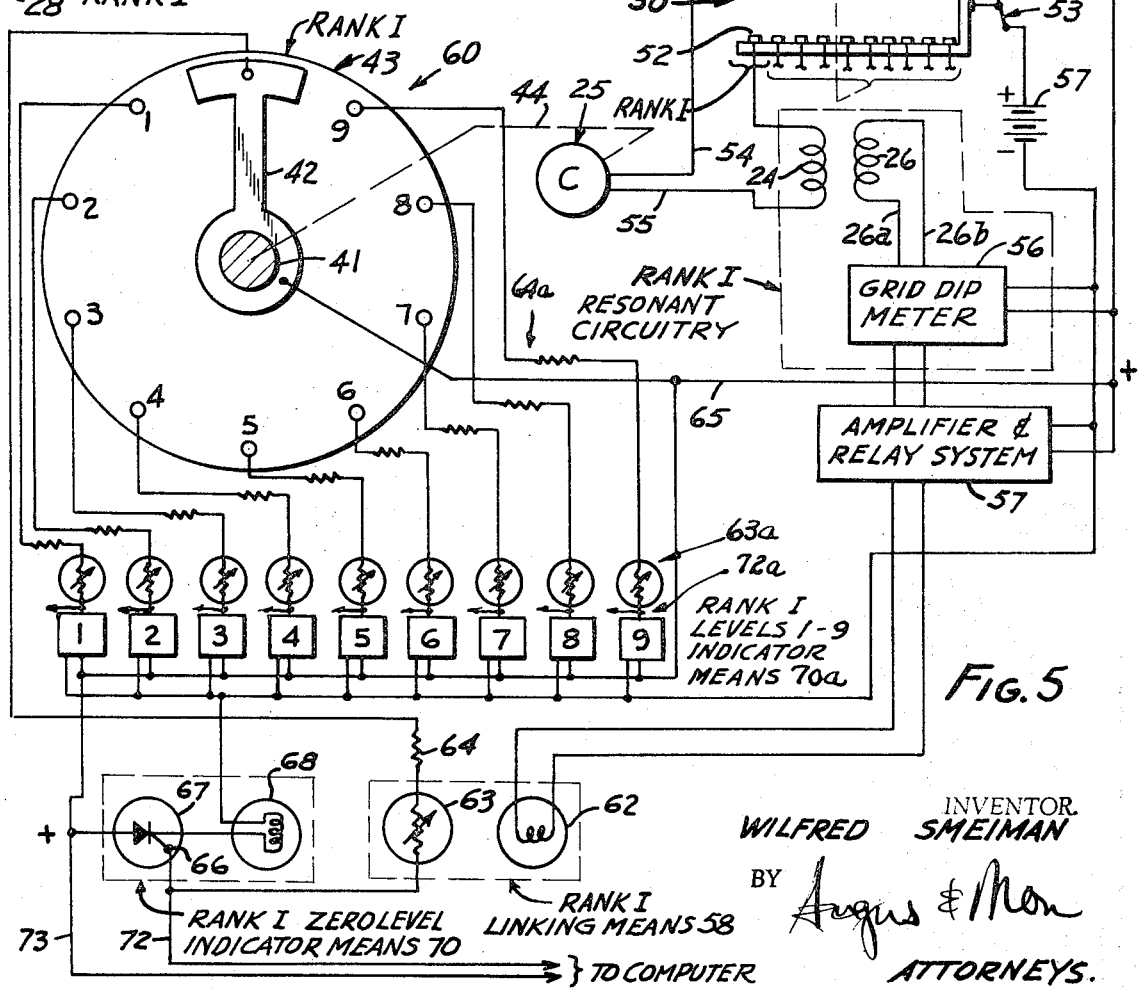
INVENTOR.
WILFRED SMEIMAN
BY
ATTORNEYS.

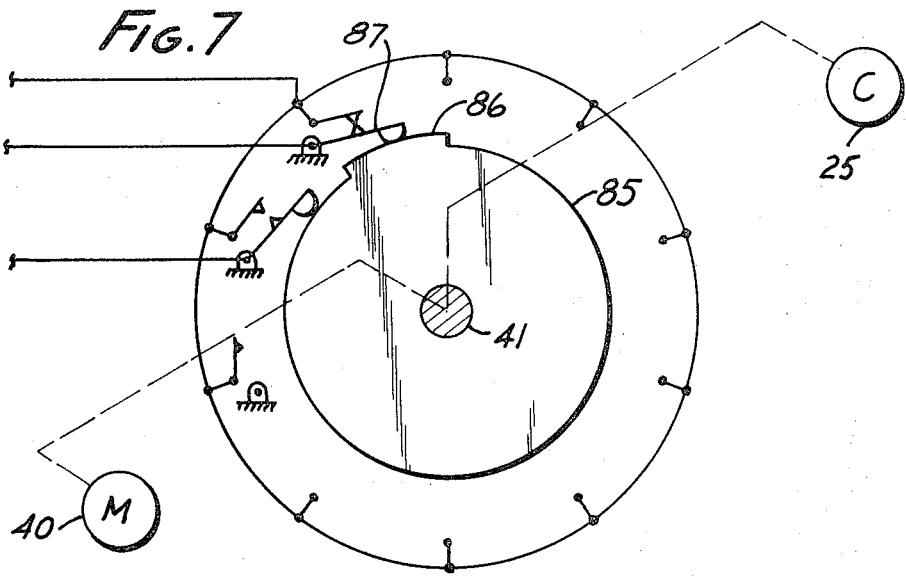
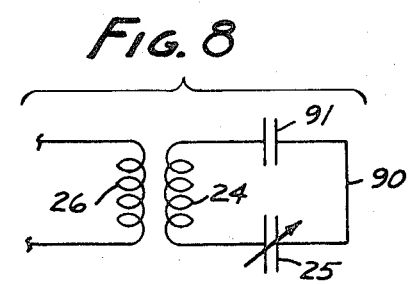
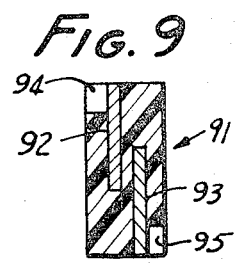
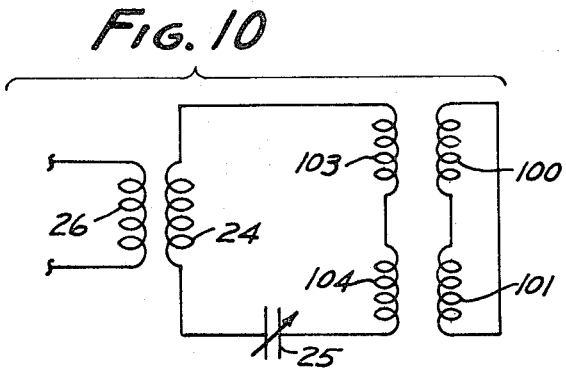
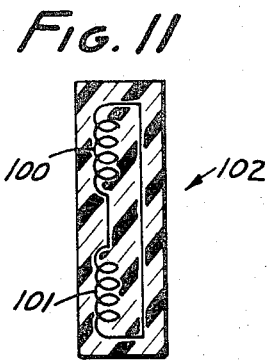
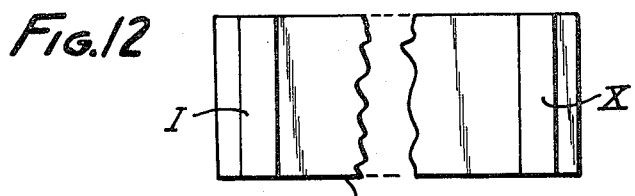

United States Patent Office 3,530,281
Patented Sept. 22, 1970

3,530,281
DATA STORAGE AND READOUT DEVICES
Wilfred Smeiman, 33372 Bremerton St.,
Dana Point, Calif. 92629
Filed Sept. 13, 1966, Ser. No. 579,113
Int. Cl. G07f 1/06; G06k 7/00, 19/00, 21/00
U.S. Cl. 235—61.11                                    15 Claims

ABSTRACT OF THE DISCLOSURE

This invention relates to a system for storing and reading out value levels in one or more ranks. Storage means bears for each rank a complete circuit element (a "value element") with an electrical property whose value is proportional to a selected postulated level. A value loop is formed with the value element, a reference coil and a variable element which can be caused to resonate, and whose resonation may be read out as a function of the value with the circuitry described herein.

---

This invention relates to a system for storage and readout of value levels, which system is of utility in applications such as machine accounting, and in transactions involving credit cards. The storage means is useful as a credit.

The provision of data to computers, or the readout of data for other purposes has been the subject of steady development in recent years. Among the problems involved in the increasing use of machine accounting for various transactions is the need to identify an account or other reference number rapidly, so as to provide an input of data or an address to the account, or to visualize hidden information known only to proper holders of the cards or other storage systems. The instant solution to these problems enables nearly instantaneous credit checks to be made, and also keeps very current the status of an individual's account, because the identity of the account is carried with the card in a condition to be instantly fed to a computer or readout device.

It is an object of this invention to provide a storage device wherein a card or other device can have concealed therein data or identification respective only to an individual's account, and to provide a system for utilizing the storage means, which system is relatively inexpensive to manufacture and simple to use.

The system according to this invention provides readout means for value levels in a rank. The term "rank" is sometimes used herein to indicate an element of a number, which number consists of more than one numeral or other indicia. Each rank is capable of assuming any one of a plurality of postulated value levels. For example, the numeral 12, has two ranks, the first rank having a value level of 1, and the second rank having a value level of 2. The system is expansible to handle any number of ranks.

A storage means according to this invention comprises a value element, for example a capacitor, whose capacitance is function of the selected value level. The system includes a variable element, for example a variable capacitor whose capacitance is adjustable to different settings, there being one of said settings respective to each of the postulated value levels. There is also a reference coil of fixed inductive properties. The value element, variable element and reference coil are connected in series circuit form a "value loop." Capacitance is the prefererd property for determining the value level, although inductance could be used instead.

A probe coil of fixed inductive properties is inductively linked to said reference coil, and has imposed thereon a reference frequency. Detector means has a first output respective to resonance between the circuit which includes the two coils, and a second output respective to non-resonance thereof. There is a plurality of indicator means, one of said indicator means being provided for each postulated value level. Switching means is adapted to switch from one indicator means to another. Simultaneously it sets the variable element to a setting respective to that on the indicator means which is respective to its own present setting. Linking means receives the output from the detector means and is adapted to actuate the indicator means respective to the respective level when the circuits associated wth the coils are resonant, thereby providing at the indicator means a signal to a viewer, to a computer, or to the other points of usage.

The invention will be fully understood from the following detailed description and the accompanying drawings, in which FIG. 1 is a circuit drawing indicating the basic scheme of the invention;

FIG. 2 is a fragmentary plan view of the presently preferred storage means according to the invention;

FIGS. 3 and 4 are cross-sections taken at line 3—3 and 4—4 respectively of FIG. 2;

FIG. 5 is a circuit drawing partly in schematic and partly in mechanical notation, showing a system for one rank according to the present invention;

FIG. 6 is a fragmentary view showing a portion of FIG. 5;

FIG. 7 is a schematic plan view showing an alternative embodiment of a portion of FIG. 5;

FIG. 8 shows an alternative type of value loop useful in this invention;

FIG. 9 is a cross-section of a storage means useful in the value loop of FIG. 8;

FIG. 10 shows another alternative type of value loop useful in this invention;

FIG. 11 is a cross-section of storage means useful in the value loop of FIG. 10; and FIGS. 12 and 13 are top and side views of still another embodiment of storage means.

The scheme of this invention will best be understood from initial reference to FIG. 1 wherein there is schematically shown a storage means 20 which will be described in detail below. This storage means includes a pair of fixed capacitors 21, 22 and a value capacitor 23 (sometimes called a "value element"). Capacitors 21 and 22 are optional. They are the linkages to a circuit wherein no direct contact is made with the internal elements of the storage means. They constitute capacitative couplings. These are connected in series to a reference coil 24, which reference coil has a fixed inductive value. Also in series therewith is a variable capacitor 25 (sometimes called a "variable element"). It will be seen that this group of elements provides a portion of a potentially resonant circuit, and this portion is sometimes called a "value loop."

A probe coil 26 is inductively coupled to coil 24, and is conductively connected to other circuitry which impresses upon it a reference frequency. It will now be understood that, for any frequency impressed upon probe coil 26, there is some setting of variable element 25 which, with the fixed-value reference coil and the respective value element (capacitor 23), will cause resonance to occur in the system.

This system senses this resonance and when resonance exists, produces a signal which is utilized for readout purposes. The value loop thereby provides a circuit which will, at some position of the variable element, resonate, and this portion is indicative of the value level and can be used as a source of a readout signal.

Storage means 20 is most fully shown in FIGS. 2, 3 and 4. In its preferred embodiment it constitutes a flat card similar to plastic credit cards, and may be of indefinite length. There are shown two ranks which are arbitrarily referred to as rank I (FIG. 3) and rank X (FIG. 4). There may be any number of ranks in between these two, and the circuitry shown will be generally duplicated for each value. The construction of the ranks is the same except for the value level of each, when said levels are different. Two different levels are shown, in order to illustrate this feature of the invention.

The storage means comprises a flat structure adapted to be connected to a pair of electrodes 27, 28. These electrodes are not carried by the card. They constitute socket means separate from the storage means. There is a pair of these electrodes for each of the ranks. Electrodes 29 and 30 are shown for rank X. The storage member includes a body 30a of dielectric material. Within this body of dielectric material, there are embedded first and second value strips 31, 32 for rank I, and 33, 34 for rank X. These strips are hidden and constitute a security feature. They are conductive, and may be made of metal, or even of conductive ink painted on the material 30a in separate layers before bonding them together. Alternatively, the entire card may be cast in a unitary piece.

It will be noted that electrode 27 will overlay strip 31, when the storage means is in the socket, forming capacitor 21 of fixed value, and that electrode 28 will overlay a portion of strip 32 to form capacitor 22 of fixed value. Strips 31 and 32 partially overlay each other as do strips 33 and 34, and their overlapped dimension is shown in the drawings as dimension A. In FIG. 3 the overlay is relatively small, thereby creating a small capacitance. In FIG. 4 the overlay is relatively larger, thereby creating a larger capacitance.

The storage means comprises a device wherein the value capacitor has a capacitance which is a function of a selected one of a plurality of postulated value levels. These levels can be established by providing overlays of the value strips which progressively increase in about 10% increments from unit to unit in the value level scheme. Therefore, each of the ranks shown may have a particular value level selected from one of a plurality of specified value levels, for example the integral numbers. The difference in value level resides in different dimensions A, and thereby of different capacitances.

It will now be seen that any number of ranks may be provided, any of which may be provided with a capacitance respective to a specified value level, and a card with a group of ranks can be provided which, when the capacitances are sensed, can provide for readout of the specific value levels involved. It is the function of the circuitry yet to be described to readout these value levels.

FIG. 6 shows a portion of FIG. 5 and particularly illustrates switching means used therein. A motor 40 rotates a shaft 41 which shaft turns a brush 42 relative to a fixed plate 43. The shaft 41 rotates so that brush 42 scans the entire face every 360° of its rotation. An extension 44 of shaft 41 rotates a ganged group of rotary variable capacitors mounted to a fixed face. There will be an individual capacitor for each rank, all of which are linked for simultaneous motion. There need be only one switching means. The circuitry of all ranks may be joined to this one switching means.

A holder 50 is shown in FIG. 5 which includes two rows of electrodes 51, 52. The electrodes are provided in sets of two for each rank, the left hand set of these electrodes may, for example, correspond to electrodes 27 and 28 of FIG. 3, and serve to capacitatively link the value element of rank I into the value loop of rank I. A switch 53 is provided for re-start purposes. This switch is closed when data storage means 20 is placed in the holder, and is opened when it is removed.

It will be noted that leads 54, 55 are connected to variable capacitor 25 and to reference coil 24 when the storage means is in the holder. The value loop is now formed. In this embodiment it includes the three fixed capacitors of FIG. 1. Were other connection means used, such as that of FIG. 9, yet to be described, then the value loop would have only one fixed capacitor.

Probe coil 26 is connected to a grid dip meter 56. A grid dip meter is a well-known standard device, which has two features and functions which are pertinent to this invention. First, it comprises a means imposing a reference frequency on the probe coil. Second, it comprises detector means having a first output respective to resonance between the circuitry which includes the two coils, and a second output respective to non-resonance thereof. The second output might be a relatively high grid current and the first output some relatively lower grid current. A power supply 57 is turned on when switch 53 is closed, and supplies power to the grid dip meter and also to an amplifier and relay system 57a which amplifies the output of the grid dip meter, supplying the same to linking means 58.

The linking means for rank I is linked to all indicator means of its respective rank. There will be a grid dip meter or other detector means for each rank, as also will there be linking means and indicator means for each additional rank.

The brush 42 and plate 43 comprise switching means 60 which is adapted to scan a plurality of circuits (in one or more ranks) by switching from contact to contact as the variable capacitor 25 changes in value. The capacitance of the variable capacitor changes continuously from some initial value to a higher value and returns each time it makes one full revolution. There will be some point at which its capacitance will, with the respective value level of the storage means and with the reference coil, form a resonant circuit with the circuitry that includes the probe coil.

As the capacitance of capacitor 23 increases, then resonance will occur when the capacitance of variable capacitor 25 decreases by a compensatory amount, and vice versa. Therefore, as shafts 41 and 44 rotate and brush 42 scans across contacts 61, it will sequentially make contact with circuits which provide leads from these contacts that go to indicator means, indicated by numeral 0–9 in FIG. 5. Simultaneously, the capacitance of variable capacitor 25 varies. At some time in this scanning operation, the grid meter will change its condition to indicate resonance, and a signal will go forward to illuminate a light 62 in the linking means. This light is linked to a photoelectric cell 63, which forms the remainder of the linking means. There is one of these photoelectric cells for every level of every rank. Cell 63 is respective to level zero. Similar cells, labelled 63a, are provided for levels 1–9 in the same rank. Each one of each rank is optically linked to the respective lamp of its rank. Thus, as the lamp lights, all of the photoelectric cells of its rank are activated, i.e. their resistances drop. Now there remains the down-circuit function of circuit selection from the switching means which must be concurrent with the up-circuit means, the coincidence of which will determine and supply a signal which represents the value level of the rank.

The above is accomplished as follows. When resonance occurs, lamp 62 lights. All photoelectric cells 63 and 63a are activated. Thus, all circuits are potentially capable of producing a signal. Each of the photoelectric cells has in series with it a respective limiting resistor. Resistor 64 is respective to level zero. Similar resistors, labelled 64a, are respective to levels 1–9.

A positive line 65 connects to all level indicator means. Level indicator means 70 is shown in detail. Level 1–9 indicator means are analogously connected to similar indicator means, which are labelled 70a.

Positive line 65 is in series connection with the power supply and switch 53. It connects with brush 42 and with the anode of a silicon controlled rectifier 67 of each level. Lead 73 is connected to one branch of a computer circuit, should a computer signal be desired.

The contacts 61 of the switching means are connected to level indicator means for respective levels through limiting resistors 64 and 64a, which, after passage through the respective photocells 63 and 63a, are connected to the gate 66 of the respective SCR's. The SCR's are connected to signal means such as lamps 68. The SCR's are latching devices. Once actuated, they remain so until switch 53 is opened. Each level has circuitry duplicate to that just described for level zero.

Rank I levels 1–9 indicator means 70a are shown. Each is identical to means 70, there being one for each level, including a photocell for each level, all of said photocells being exposed to lamp 62, just as is photocell 63. Corresponding groups of devices have been labelled 63a, 64a and 70a. Each of the numbered blocks includes the circuitry and lamp shown in block 70 and each includes a respective lead 72 to a computer.

For purposes of illustration, the circuitry of the zero level indicator means 70 of rank I will be described in detail. The circuitry is identical for each of the other levels in the rank. They differ only in that each level is connected to a different contact 61, which contact is respective to some particular setting of the respective variable capacitor. Assume now that the value of the storage means in rank I is zero, and that the variable capacitor is set up so that the series circuit is in resonance, brush 42 contacting the contact of the zero level, and completing a circuit to the zero level indicator means. Were the value level to be at some other value than zero, such as in rank X, which has a value level of 6, the brush would have had to reach contact 6 (or whatever the number) in order to permit actuation of the level 6 indicator means, at which time the variable capacitor 25 would have a value such that resonance would occur with a value element whose value was 6.

FIG. 7 indicates an alternate embodiment of switching means which may be directly substituted for the brush technique shown in FIG. 5. In this case, instead of a brush there is a rotary cam plate 85 which includes a rise 86 that contacts one after another of normally-open microswitches 87. There is one of these microswitches for each of the value levels, and this technique merely substitutes a mechanical off-on switch for the wiper technique of FIGS. 5 and 6. It will be understood that other electronic scanning and switching means may be substituted for the mechanical techniques shown herein, so long as they perform the same function of switching from level indicator to level indicator as the capacitance of the variable capacitor changes.

FIGS. 8 and 9 illustrate a value loop 90 which includes reference coil 24, variable capacitor 25, and probe coil 26. It deletes capacitors 21 and 22. This is accomplished with the use of storage means 91 which includes strips 92 and 93 having the same properties as strips 31 and 32. The structure differs from that of storage means 20 by including recesses 94 and 95 that leave the strips exposed. Then the socket makes a conductive, rather than a capacitative, connection with the strips. The performance of the circuitry is, however, identical. The storage means of FIG. 3 is preferable, because no part of the data means is exposed to wear or damage.

FIGS. 10 and 11 illustrate use of inductance instead of capacitance to achieve value levels. Two coils 100 and 101 are embedded in the structure of the storage means 102. These are coupled to each other and any incremental differences will have an effect on the resonance of the value loop, just as the capacitance had in the other embodiments. Coupling coils 103, 104 inductively incorporate storage means into the value loop.

FIGS. 12 and 13 illustrate that the storage means need not be embedded. A substrate card 105, which might be an already-existing credit card, has ranks I and X applied thereto in the form of overlays applied thereto by cementing or otherwise. These overlays have the characteristics of any of the other embodiments only they are attached to a carrier, instead of being bonded thereto. This permits existing credit cards readily to be adapted to this new process.

The storage means according to this invention need not involve both sides of a card. Instead, the data may be supplied to both sides, and isolation means such as a conductive metal plate may be inserted between the two sides. The utility of the card may thereby be doubled.

This invention thereby provides storage means of a class wherein value levels respective to given ranks may be provided, and which may thereafter be made a portion of a circuit which utilizes its value for setting a resonant level and determining the value level for readout purposes by indicating the level at which resonance occurs.

I claim:

1. A system for storage and readout of value levels in a rank, which rank is capable of assuming any one of a plurality of postulated value levels, said system comprising:
   (a) a storage means comprising a value element comprising a complete circuit component, one of whose electrical properties is proportional to a selected one of said value levels;
   (b) a variable element one of whose electrical properties is adjustable selectable to a plurality of settings, there being an available setting respective to each of the postulated value levels;
   (c) a reference coil of fixed inductive properties, the said value element, variable element and reference coil being connected in series circuit to form a value loop;
   (d) a probe coil of fixed inductive properties inductively linked to said reference coil;
   (e) means imposing a reference frequency on said probe coil;
   (f) detector means having a first output respective to resonance between the circuitry which includes the two coils, and a second output respective to non-resonance thereof;
   (g) a plurality of indicator means, there being a respective one of said indicator means for each specified value level;
   (h) switching means adapted to switch from indicator means to indicator means, and simultaneously to set the variable capacitor to a setting respective to the indicator means which is indicative of the same value level; and
   (i) linking means receiving the output from the detector means, and adapted to actuate the indicator means respective to a selected level when the circuits associated with the coils are resonant.

2. A system according to claim 1 in which a plurality of said ranks is provided on said storage means.

3. A system according to claim 2 in which the said electrical property of the value and variable elements is capacitance.

4. A system according to claim 1 in which the storage means comprises a body of dielectric material and a first and a second conductive strip in said dielectric material at least partially overlaying each other to form said value capacitor, the capacitance of the value capacitor being a function of the amount of overlay and thereby a function of the value level of the rank.

5. A system according to claim 4 in which a plurality of said ranks is provided on said storage means.

6. A system according to claim 5 in which the variable elements are capacitors and are mechanically linked, and in which all ranks read out at the same time.

7. A system according to claim 4 in which latching means is provided to continue the operation of the indicator means after resonance ceases and until the cycle is re-started.

8. A system according to claim 4 in which the linking means comprises an illuminable lamp and a photocell responsive to the lamp to actuate a selected one of said indicator means, there being a photocell for each level of each rank.

9. A system according to claim 8 in which the indicator means includes a silicon controlled rectifier actuated by simultaneous resonance and selection of the respective indicator means.

10. A circuit for reading out a value level from a rank is capable of assuming any one of a plurality of postulated value levels, the level being contained in a storage means which comprises a value element one of whose electrical properties is a function of the selected one of said value levels, the value element comprising a complete electrical circuit component, said circuit comprising:
   (a) a variable element one of whose electrical properties is adjustable selectable to a plurality of settings there being an available setting respective to each of the postulated levels;
   (b) a reference coil of fixed inductive properties, the variable element and reference coil being connected in series circuits, and the circuit being adapted to incorporate the value element in series connection with the aforesaid variable element and reference coils to form a value loop;
   (c) a probe coil of fixed inductive properties inductively linked to said reference coil;
   (d) means imposing a reference frequency on said probe coil;
   (e) detector means having a first output respective to resonance between the circuitry which includes the two coils, and a second output respective to non-resonance thereof;
   (f) a plurality of indicator means, there being a respective one of said indicator means for each specified value level;
   (g) switching means adapted to switch from indicator means to indicator means, and simultaneously set the variable capacitor to a setting respective to the indicator means indicative of the same value level; and
   (h) linking means receiving the output from the detector means, and adapted to actuate the indicator means respective to a selected level when the circuits associated with the coils are resonant.

11. A circuit according to claim 10 in which the said selectable property of the value and variable elements is capacitance.

12. A circuit according to claim 10 in which a plurality of said ranks is provided on said storage means.

13. A circuit according to claim 12 in which the variable elements are capacitors and are mechanically linked and in which all ranks are read out at the same time.

14. A circuit according to claim 13 in which the linking means comprises an illuminable lamp and a photocell responsive to the lamp to actuate a selected one of said indicator means, there being a photocell for each level of each rank.

15. A system according to claim 1 in which the said electrical property of the value element is inductance.

References Cited

UNITED STATES PATENTS

| | | |
|---|---|---|
| 2,508,953 | 5/1950 | Knutsen. |
| 2,547,838 | 4/1951 | Russell. |
| 2,774,060 | 12/1956 | Thompson. |
| 3,044,694 | 7/1962 | Davidson et al. _____ 235—61.116 |
| 3,154,761 | 10/1964 | O'Gorman. |
| 3,239,815 | 3/1966 | Martens. |
| 3,312,372 | 4/1967 | Cooper _____ 235—61.11 |
| 3,387,265 | 6/1968 | Smeiman _____ 235—61.12 X |
| 3,404,382 | 10/1968 | Rosenheck et al. _ 235—61.116 X |

DARYL W. COOK, Primary Examiner

R. M. KILGORE, Assistant Examiner

U.S. Cl. X.R.

194—4; 235—61.12; 340—149

UNITED STATES PATENT OFFICE
CERTIFICATE OF CORRECTION

Patent No. 3,530,281        Dated  September 22, 1970

Inventor(s)  Wilfred Smeiman

It is certified that error appears in the above-identified patent and that said Letters Patent are hereby corrected as shown below:

Column 1, line 69, "prefered" should read -- preferred --. Column 2, line 1, "circuit" should read -- circuitry --; line 14, cancel "the". Column 7, line 8, before "is" insert -- which rank --; line 37, before "set" insert -- to --.

Signed and sealed this 1st day of December 1970.

(SEAL)
Attest:

EDWARD M. FLETCHER, JR.          WILLIAM E. SCHUYLER, JR.
Attesting Officer                Commissioner of Patents